(12) United States Patent
Lau et al.

(10) Patent No.: US 10,836,890 B2
(45) Date of Patent: Nov. 17, 2020

(54) MECHANICALLY REINFORCED, TRANSPARENT, ANTI-BIOFOULING THERMOPLASTIC RESIN COMPOSITION AND MANUFACTURING METHOD THEREOF

(71) Applicant: Nano and Advanced Materials Institute Limited, Hong Kong (HK)

(72) Inventors: Yiu Ting Richard Lau, Hong Kong (HK); You Wu, Hong Kong (HK); Yueying Chen, Hong Kong (HK); Wenjun Meng, Hong Kong (HK); Sau Kuen Connie Kwok, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 284 days.

(21) Appl. No.: 15/415,426

(22) Filed: Jan. 25, 2017

(65) Prior Publication Data
US 2018/0208753 A1    Jul. 26, 2018

(51) Int. Cl.
*C08L 23/12* (2006.01)
*C08L 33/12* (2006.01)
(Continued)

(52) U.S. Cl.
CPC .............. *C08L 23/14* (2013.01); *B29B 7/005* (2013.01); *B29B 7/88* (2013.01); *B29C 41/003* (2013.01);
(Continued)

(58) Field of Classification Search
CPC .... B29B 9/00; B29B 9/06; B29B 9/12; B29C 51/02; B29K 2105/0011; B29K 2101/12;
(Continued)

(56) References Cited

U.S. PATENT DOCUMENTS 4,441,881 A * 4/1984 Ruppert .................... C11D 1/72
427/393.4
5,605,937 A * 2/1997 Knaus ....................... B29B 9/06
521/60
(Continued)

FOREIGN PATENT DOCUMENTS

CN        1209827    *   3/1999
CN        1209827 A      3/1999
(Continued)

OTHER PUBLICATIONS

Xie et al., "Coatings with a self-generating hydrogel surface for antifouling", Polymer 2011, 52, 3738-3744.
(Continued)

*Primary Examiner* — Nahida Sultana
*Assistant Examiner* — Debjani Roy
(74) *Attorney, Agent, or Firm* — Spruson & Ferguson (Hong Kong) Limited

(57) ABSTRACT

This invention discloses a transparent standalone resin or masterbatch concentrate composition and manufacturing method of transforming commercial transparent grade base thermoplastics into anti-biofouling resins through extrusion or any similar hot melt mixing processes. The re-compound solids enable a number of product reforming processes, including but not limited to thermoforming, profile extrusion, injection molding, blow molding, blow filming, film casting, and spinning into articles of different shapes and geometries or overmolding on plastic substrates that can resist surface adsorption of microbes, mammalian cells, proteins, peptides, nucleic acids, steroids and other cellular constituents after solidification. The articles formed thereof additionally exhibit mechanical reinforcement and no leaching while retain the optical clarity of the base thermoplastics (Continued)

in the same product form as quantified in terms of the light transmittance and haze.

20 Claims, 5 Drawing Sheets

(51) Int. Cl.
    *C08L 23/14*           (2006.01)
    *B29B 7/88*            (2006.01)
    *B29C 41/00*           (2006.01)
    *B29C 48/00*           (2019.01)
    *B29B 7/00*            (2006.01)
    *B29C 49/00*           (2006.01)
    *B29K 101/12*          (2006.01)
    *B29K 105/00*          (2006.01)
(52) U.S. Cl.
    CPC ............ *B29C 48/022* (2019.02); *C08L 23/12* (2013.01); *C08L 33/12* (2013.01); *B29C 49/0005* (2013.01); *B29K 2101/12* (2013.01); *B29K 2105/0005* (2013.01); *B29K 2995/0026* (2013.01); *C08L 2201/08* (2013.01); *C08L 2201/10* (2013.01); *C08L 2205/06* (2013.01); *C08L 2310/00* (2013.01)
(58) Field of Classification Search
    CPC ...... C08L 33/12; C08L 23/12; C08L 2201/10; C08L 2205/06
    See application file for complete search history.

(56) References Cited

U.S. PATENT DOCUMENTS

| | | | |
|---|---|---|---|
| 6,303,078 B1 | 10/2001 | Shimizu et al. | |
| 6,482,892 B1* | 11/2002 | Katayama | C08L 21/00 525/191 |
| 8,344,043 B2* | 1/2013 | Jin | C08L 33/12 523/122 |
| 2002/0115818 A1* | 8/2002 | Ogo | B01J 2/20 528/310 |
| 2009/0094954 A1 | 4/2009 | Nakayama et al. | |
| 2010/0130665 A1 | 5/2010 | Beigbeder et al. | |
| 2010/0280174 A1 | 11/2010 | Bookbinder et al. | |
| 2011/0177237 A1 | 7/2011 | Qian et al. | |
| 2012/0271026 A1* | 10/2012 | Barman | C08G 18/1825 528/49 |
| 2013/0064996 A1* | 3/2013 | Mashburn | E01C 13/08 428/17 |
| 2014/0302000 A1* | 10/2014 | Shlieout | A61K 9/1075 424/94.2 |
| 2015/0197644 A1 | 7/2015 | Chang et al. | |
| 2015/0218390 A1 | 8/2015 | Palza Cordero et al. | |
| 2015/0237866 A1* | 8/2015 | Goudswaard | A01N 59/16 424/641 |
| 2016/0002489 A1 | 1/2016 | Gleason et al. | |
| 2016/0347915 A1* | 12/2016 | Oda | C08J 3/12 |
| 2017/0129139 A1* | 5/2017 | Lau | B29B 9/06 |
| 2018/0201797 A1* | 7/2018 | Taniguchi | C09D 5/165 |

FOREIGN PATENT DOCUMENTS

| | | |
|---|---|---|
| CN | 102942708 A | 2/2013 |
| DE | 19643585 A1 | 4/1998 |
| WO | 2016015005 A1 | 1/2016 |
| WO | 2016110271 A1 | 7/2016 |

OTHER PUBLICATIONS

Office Action of CN 201710168759.4 issued from the State Intellectual Property Office of the People's Republic of China dated Dec. 20, 2019.

\* cited by examiner

MECHANICALLY REINFORCED, TRANSPARENT, ANTI-BIOFOULING THERMOPLASTIC RESIN COMPOSITION AND MANUFACTURING METHOD THEREOF

CROSS-REFERENCE TO RELATED APPLICATIONS

There are no related prior applications

TECHNICAL FIELD

The present invention relates to methods for modifying transparent grade base thermoplastics to increase their surface biofouling resistance with added mechanical reinforcement while retain the light transmittance and haze of the base thermoplastics after product forming processes. In particular, the present invention relates to methods of introducing suitable chemical modifiers to the base materials through extrusion or hot melt mixing in order to increase surface biofouling resistance of the base thermoplastics. It also relates to the product formed therefrom.

BACKGROUND OF THE INVENTION

Transparent plastics ordinarily are rigid thermoplastics such as poly(methyl methacrylate) (PMMA), polystyrene (PS), polyethylene terephthalate (PET), polycarbonate (PC), polymethylpentene (PMP), polysulfone, polyamide (PA), polyvinyl chloride (PVC), styrene acrylonitrile (SAN), styrene-methacrylate based copolymer, polypropylene based copolymer, acrylonitrile butadiene styrene (ABS), polyimide (PI) and cellulosic resins. Transparent plastics are regarded as plastics with light transmission percentage of more than 80%. These plastics can be used in aquariums, signboards, automobile taillights, bathtub liners, sinks, cell phone display screens, backlight optical waveguides for liquid crystal displays (LCD), lighting bulb shells and aircraft window panels due to their low cost and ease of processing as well as their lightweight, shatter resistant, low-temperature impact resistant and chemical resistant properties. They are therefore expected to replace the unbendable oxide glasses in a wider range of applications in the near future apart from the large application base in commodity products including food and cosmetics packaging, construction, electrical appliances, toys, stationery, spectacles and more.

There is a strong motivation for incorporation of surface biofouling resistance into optically clear plastics that can be found in daily life applications, for instance, the dust collection chamber of the vacuum cleaner, the refillable liquid soap dispenser and the paper roll holder which necessitates sanitary conditions against microbes. Previous research showed that 50% of vacuum cleaner brushes contained fecal bacteria and E. coli. Another data supported that 25% of the refillable soap dispenser in the public restrooms was contaminated with more than 1 million colony-forming units (CFU) per milliliter of bacteria and 16% of the soap samples contained coliform bacteria. On average, at least 10,000-fold increase in the bacteria population is expected over 5 hours in a non-sanitized and nutrient-enriched ambience.

Conventional non-fouling modification of polymers is usually achieved by surface modification and coating with hydrophilic layers on the polymeric surfaces after molding. This can be demonstrated in a number of disclosures as follows.

CN102942708 discloses a wet chemical approach to obtain surface hydrophilic polypropylene material in the form of film, mesh, wire, particles or microspheres, by grafting a monomeric maleic anhydride onto a polypropylene and then polyethylene glycol onto the maleic anhydride. This is yet a surface modification process on a preform of polypropylene material to impart the antifouling properties.

One non-patent citation describes a combined self-hydrogel-generating and self-polishing crosslinked polymer coating, where hydrolysable polymer chains are kept leaching out from the top to keep the surface antifouling (Xie et al. *Polymer* 2011, 52, 3738).

DE19643585 reveals an anti-adhesive agent, containing sphingolipid, against microorganisms, viruses, parasites and protozoa.

US20110177237 utilizes chromen-4-one derivatives as non-toxic, environment friendly antifouling agent, a coating material for objects submerged under the water and subject to biofouling.

WO2016015005 discloses a three-component, protein-repellent dental bonding system based on 2-methacryloyloxyethyl phosphorylcholine as the active protein repellent agent.

US20090094954 discloses an antifouling composite material through disposing an inorganic fine particle layer on a surface of the substrate.

Some employ various classes and structures of functional polymers as coatings to impart fouling resistance of relevantly compatible substrates towards marine organisms as exemplified by US20160002489, US20150197644, US20100130665 and U.S. Pat. No. 6,303,078.

Especially to living matters, one even adopts the time release of antimicrobial compounds from the polymeric materials, such as US20150218390, to avoid adherence of microorganisms to form a biofilm and/or kill the microorganisms already adhered inhibiting their growth, which is ecologically unfriendly and potentially toxic to the mankind.

As inspired from the earlier fundamental researches, surface energy of the substrate definitely plays an important role. Minimal long-term adhesion of microbes is associated with surfaces having initial surface tensions between 20 and 30 mN/m, i.e. low-energy surfaces. Silicones and fluoropolymers are the two well-known non-fouling organic compounds having been used as the essential coating ingredients due to their low surface energies.

WO2016110271 discloses a built-in modification method to enable antimicrobial property of polymers, through repelling the microbes from the article surfaces based on an antifouling agent. The antifouling agent is selected from a hydrophilic forming group consisting of polyol, polyoxyether, polyamine, polycarboxylate, polyacrylate, polyvinylpyrrolidone, polysaccharide, Zwitterionic polyelectrolyte, a copolymerized system of polymer segments of mixed charges and/or an interpenetrating blend mixture of cationic and anionic polymers. The agent has to react with maleic anhydride on a polymer carrier as a coupling linker and to be blended with the base polymer.

US20100280174 discloses a melt blending process to incorporate non-ionic surfactants having an HLB number of less than or equal to 10 into hydrophobic polymers. The molded articles show the protein resistance due to surface migration of the surfactants. However, there are no relevant claims to indicate the bulk physical change and more astoundingly, mechanical reinforcement, as well as retention of the optical properties after the said modification.

SUMMARY OF THE INVENTION

Accordingly, in a first aspect of the present invention, a melt compounding strategy to non-covalently blend or covalently graft the non-fouling moieties onto the backbones of various optically clear copolymer resins is employed into a method for modifying a transparent grade thermoplastic, wherein said method comprises firstly using reactive melt extrusion on a screw extruder to produce granular resins with non-fouling property from a composition comprising said transparent grade thermoplastic and then injection molding for product forming from pelletized granules prepared early on. The transparent grade thermoplastic being modified by the present method includes but not limited to homopolymers, copolymers and blends of polyolefins, cyclic polyolefins, acrylics, acetates, styrenics, polyesters, polyimides, polyaryletherketones, polycarbonates, polyurethanes and thermoplastic elastomers. In a preferred embodiment, the transparent grade thermoplastics being modified by the present method includes but not limited to poly(methyl methacrylate) (PMMA), polystyrene (PS), polyethylene terephthalate (PET), polycarbonate (PC), polymethylpentene (PMP), polysulfone, polyamide (PA), polyvinyl chloride (PVC), styrene acrylonitrile (SAN), styrene-methacrylate based copolymer, polypropylene based copolymer, acrylonitrile butadiene styrene (ABS), polyimide (PI) and cellulosic resins, methyl methacrylate butadiene styrene (MBS), styrene ethylene butylene styrene block thermoplastic elastomer (SEBS), etc. The method of the present invention also includes blending one or more linear or multi-armed structures of non-ionic surfactants as non-fouling modifiers, polyolefin elastomers and polyurethane as impact modifiers, initiators, cross-linking agents, nucleators, anti-oxidants and/or other auxiliary additives with the transparent grade base thermoplastics prior to or during melt processing of the base thermoplastics. When the afore-mentioned transparent grade base thermoplastics, chemical modifiers and auxiliary additives are added into the composition prior to said melt processing by extrusion, they should be blended thoroughly and then extruded to form a functional masterbatch. The formed masterbatch is then further blended with the transparent grade base thermoplastics for subsequent extrusion. Said melt processing can be achieved on either a single-screw or twin-screw extruder operated within a proper processing temperature range according to different melting temperatures of the transparent grade base thermoplastics and other main components for modifying the same, e.g. from 150 to 250° C. In a preferred embodiment, the processing temperature of said melt processing ranges from 170 to 220° C. After said melt processing, the melt processed composition is then subjected to cooling, followed by pelletization either separately from or continuously into the same extruder to obtain either a solid standalone or a masterbatch concentrate resin. The obtained solid or masterbatch concentrate resin is then subjected to injection molding to reform into an article with desired shape and dimension. Apart from injection molding, other molding methods such as profile extrusion, blow molding, blow filming, film casting, spinning and overmolding said standalone or masterbatch concentrate resin on plastic substrates can also be applied to reformation into an article.

The second aspect of the present invention relates to the composition for forming a functional polymer or a masterbatch concentrate resin. Said composition comprises said transparent grade base thermoplastics (70~99 wt %) as described in the first aspect and hereinafter, impact modifiers (0~30 wt %), chemical or functional modifiers (0.5~10 wt %) including non-fouling modifiers (0.1~5 wt %), and other additives (0.1~2 wt %) such as one or more of initiators, cross-linking agents, nucleators, anti-oxidants, and/or auxiliary additives (0.1~6 wt %). In the case that impact modifiers are required, the weight percentage thereof ranges from 0.1~30 wt %. Said non-fouling modifiers include one or more of linear and/or multi-armed structures of non-ionic surfactants. In a preferred embodiment, said non-ionic surfactants include fatty alcohol polyoxyalkylene ethers, polyoxyalkylene sorbitan/sorbitol fatty acid esters, polyoxyalkylene alkyl amines, polyether glycols, fatty acid alkanolamides and their derivatives. More specifically, said non-ionic surfactants include polyethylene glycol (PEG) sorbitol hexaoleate, AEO-5 and polyetheramine (e.g., JEFFAMINE® D-230 or T-5000), wherein the PEG sorbitol hexaoleate has a molecular weight ranging from 2,000 to 20,000 Da; the polyetheramine has a molecular weight ranging from 200 to 6,000 Da. Said impact modifiers include polyolefin elastomer, chlorinated polyolefin, styrenic block copolymer, ethylene propylene rubber, ethylene vinyl alcohol, acrylic resin, polyurethane, ethylene copolymerized polar terpolymer, reactive modified elastomer. Said initiators include an acid/base catalyst. More specifically, said initiators include tosylic acid, tetramethylammonium hydroxide or an organic peroxide, such as dicumyl peroxide, bis(tert-butylperoxyisopropyl)benzene, 2,5-bis(tert-butylperoxy)-2,5-dimethylhexane and benzoyl peroxide, which can exist in either standalone form or being supported on filler particles. Said cross-linking agents are rubber vulcanization agent. More specifically, said cross-linking agents include triallyl isocyanurate, N,N'-m-phenylene dismaleimide and/or sulfur. More specifically, said nucleators include MILLAD® NX8000, MILLAD® 3988, ADK STAB NA-18 and/or ADK STAB NA-25. More specifically, said anti-oxidants include butylated hydroxytoluene, IRGANOX® 1010, IRGANOX® 1076, IRGANOX® 1098, IRGAFOS® 168 or IRGANOX® B 225. Said other auxiliary additives include alumina nanoparticles, light stabilizers, antiblocks, reinforcing fillers, optical brighteners, colorants, flame retardants and deodorants. More specifically, said auxiliary additives are alumina nanoparticles (AEROXIDE® Alu C). By the present method and composition, deviation of optical transmittance and haze of the transparent grade base thermoplastics is less than 20% at 1 mm thickness under the standard of ASTM D1003, meaning that the transparency of the base thermoplastics is well maintained while they also comply with various standards for different applications including those plastics which are safe for food and drinks because the modifiers and other main components added into the composition for modifying the transparent grade base thermoplastics according to the present invention enable biofouling resistance and mechanical reinforcement of the end product or molded article reformed therefrom against fluid biological matters, such as microbes, mammalian cells, proteins, peptides, nucleic acids, steroids and other cellular constituents.

These and other examples and features of the present invention and methods will be set forth in part in the following Detailed Description. This Summary is intended to provide an overview of the present invention, and is not intended to provide an exclusive or exhaustive explanation. The Detailed Description below is included to provide further information about the present disclosures and methods.

BRIEF DESCRIPTION OF THE DRAWINGS

The present patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
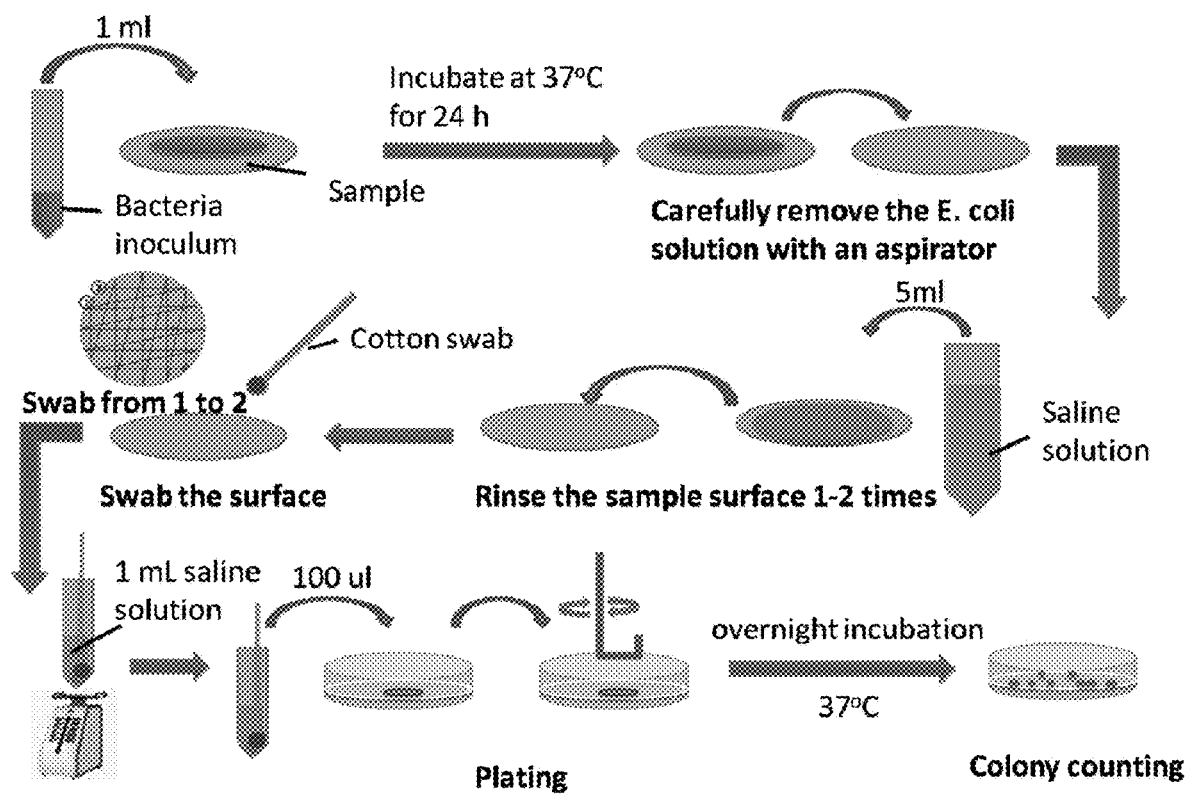
FIG. 1 is a schematic diagram showing an incubation protocol for microbial adsorption tests on different molded circular plate samples reformed by injection molding from the melt processed composition comprising the modified transparent grade base thermoplastics according to certain embodiments of the present invention.
Figure 2:
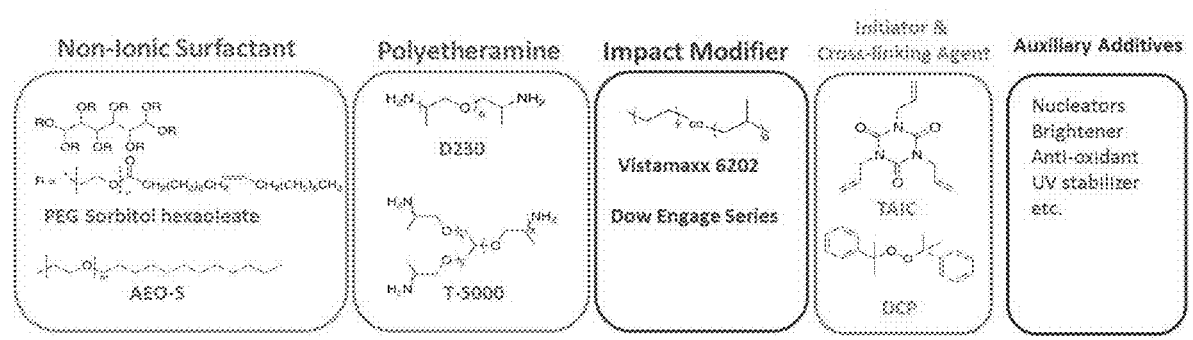
FIG. 2 is an illustration of the main components in the composition for modifying the transparent grade base thermoplastics according to certain embodiment of the present invention.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a concentration range of "about 0.1% to about 5%" should be interpreted to include not only the explicitly recited concentration of about 0.1 wt. % to about 5 wt. %, but also the individual concentrations (e.g., 1%, 2%, 3%, and 4%) and the sub-ranges (e.g., 0.1% to 0.5%, 1.1% to 2.2%, and 3.3% to 4.4%) within the indicated range.

As described herein, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E, and that the sequence still falls within the literal scope of the claimed process. A given step or sub-set of steps can also be repeated.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Definitions

The singular forms "a," "an" and "the" can include plural referents unless the context clearly dictates otherwise.

The term "about" can allow for a degree of variability in a value or range, for example, within 10%, or within 5% of a stated value or of a stated limit of a range.

The term "independently selected from" refers to referenced groups being the same, different, or a mixture thereof, unless the context clearly indicates otherwise. Thus, under this definition, the phrase "X1, X2, and X3 are independently selected from noble gases" would include the scenario where, for example, X1, X2, and X3 are all the same, where X1, X2, and X3 are all different, where X1 and X2 are the same but X3 is different, and other analogous permutations.

Detailed Descriptions of Preferred Embodiments

The present invention is not to be limited in scope by any of the following descriptions. The following examples or embodiments are presented for exemplification only.

Figure 3:
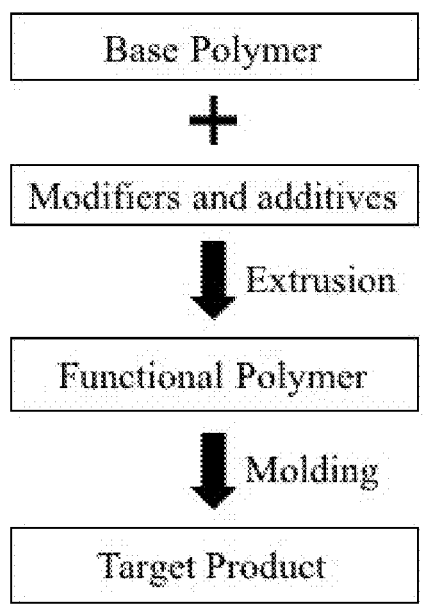
FIG. 3 is a schematic diagram showing a workflow of both one-step and two-step methods for modifying the transparent grade base thermoplastics according to certain embodiments of the present invention.
Figure 3:
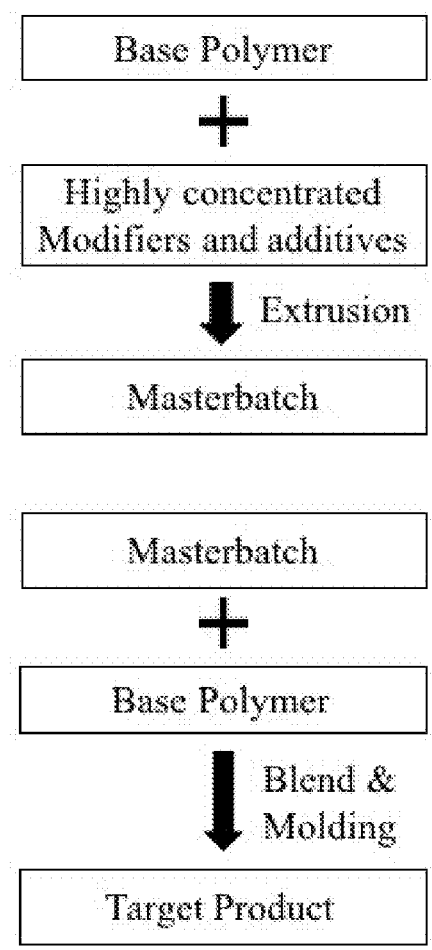

The modification of the transparent grade base thermoplastics according to the present invention can be processed in either one-step or two-step method (FIG. 3). The transparent grade base polymer is blended or reacted with chemical modifiers and/or auxiliary additives either before or during extrusion to create functional polymer (one-step) or masterbatch (two-step). Representative examples of transparent grade base thermoplastics include (-impact modified) polypropylene random (PPR) copolymers and homopolymer (PPH) and several thermoplastic elastomers, such as methyl methacrylate butadiene styrene (MBS), styrene ethylene butylene styrene block thermoplastic elastomer (SEBS) and polyurethane. Melt processing can be achieved on either single-screw or twin-screw extruder operated with a proper processing temperature window. The extruder can be equipped with a cooling water bath and a pelletizer to obtain solid standalone or a masterbatch concentrate resin prior to article reforming by injection molding, for example. The processing temperature ranges from 170 to 220° C. for said transparent grade base thermoplastics and other main components for modifying the same.

One or more of linear and/or multi-armed structures of non-ionic surfactants is/are selected as the non-fouling modifiers. The non-ionic surfactants are chosen from fatty alcohol polyoxyalkylene ethers, polyoxyalkylene sorbitan/sorbitol fatty acid esters, polyoxyalkylene alkyl amines, polyether glycols, fatty acid alkanolamides and their derivatives. Polyethylene glycol (PEG) sorbitol hexaoleate, AEO-5 and polyetheramine (JEFFAMINE® D-230 or T-5000) are preferred non-fouling modifiers. Proper ratio and combination of functional modifiers is key to the anti-biofouling performance and retention of transparency of the transparent grade base thermoplastic materials. Typical ratio is adjusted from 0.5 to 10% on a weight basis with respect to the total weight of the composition. In a specific embodiment, thePEG sorbitol hexaoleate has a molecular weight ranging from 2,000 to 20,000 Da (or 2 to 20 kDa). In another specific embodiment, said polyetheramine has a molecular weight ranging from 200 to 6,000 Da.

Elastomers, such as polyolefin elastomer (POE) and thermoplastic polyurethane (TPU), are chosen as impact modifiers for modifying different transparent grade base thermoplastics. VISTAMAXX™ and ENGAGE™ series POE and ELASTOLLAN® series TPU are preferably suggested in this case. The suggested ratio ranges from 0.1 to 30% by weight with respect to the total weight of the composition in order to augment the impact strength. Initiators and additives including tosylic acid, tetramethylammonium hydroxide, and/or an organic peroxide, such as dicumyl peroxide, bis(tert-butylperoxyisopropyl)benzene, 2,5-bis(tert-butylperoxy)-2,5-dimethylhexane and benzoyl peroxide, in a weight percentage from 0.01% to 0.2% with respect to the total weight of the composition are added to initiate covalent grafting of the non-fouling modifiers onto the base polymers and/or impact modifiers.

Other additives, such as anti-oxidant, cross-linking agent, optical brightener, color masterbatch, odor absorbent, etc. are chosen to control the appearance and the scent of the articles. The anti-oxidant is preferred to be selected from butylated hydroxytoluene, IRGANOX® 1010, IRGANOX® 1076, IRGANOX® 1098, IRGAFOS® 168 or IRGANOX® B 225 with a weight percentage to the total weight of the composition from 0.1 to 2 wt %. The cross-linking agent is preferred to be selected from triallyl isocyanurate, N,N'-m-phenylene dismaleimide or sulfur with a weight percentage to the total weight of the composition from 0 to 1 wt %. The initiator is preferred to be selected from dicumyl peroxide, bis(tert-butylperoxyisopropyl)benzene or benzoyl peroxide with a weight percentage to the total weight of the composition from 0.01 to 0.2 wt %. The nucleator is preferred to be selected from MILLAD® NX8000, MILLAD® 3988, ADK STAB NA-18 or ADK STAB NA-25 with a weight percentage to the total weight of the composition from 0 to 3 wt %. An auxiliary additive is preferred to be alumina nanoparticles (AEROXIDE® Alu C) for enhancement of the heat deflection temperature of base polymers with suggested weight percentage to the total weight of the composition from 0.1 to 4 wt %.

During injection molding, the cycle time typically ranges from a few seconds to 5 minutes for extremely thick-wall parts per shot. On average, the injection falls in the range between 20 and 60 seconds for a well-designed mold and with a proper barrel and mold temperature control. For instance, samples of dogbone tensile test bars (Type I, ASTM D638), Izod impact test bars (ASTM D256), flat circular plates with thickness of 1.5 mm and diameter of 60 mm for optical haze/transmittance (ASTM D1003) and yellowness index (ASTM E313) measurement and rectangular strips for heat deflection temperature measurement (ISO 75) were produced on a 150-ton injection molding machine in one single shot from the mold cavity. Extrusive compounding was performed on a co-rotating twin-screw extruder. The extruder had a screw diameter of 26 mm, a screw length-to-diameter (L/D) ratio of 42:1 and an adjustable speed of 50-500 rpm. Its barrel was divided into 7 temperature zones, one of which was located at the die orifice. The extruder was equipped with a volumetric feeder composed of two separate compartments that can feed two different types of raw materials at an equivalent ratio.

Protein repellent assay procedures are herein described as follows:

(a) 0.5 ml bovine serum albumin (BSA)/0.01 M phosphate-buffered saline (0.1 g/ml, pH 7.4) protein solution is wetted on a flat surface of a molded circular plate sample;

(b) The protein solution is placed at room temperature for half an hour for adsorption;

(c) The protein solution is withdrawn by aspiration;

(d) Bradford reagent (Cat. no. B6916, Sigma) of the same volume is deposited on the affected area to stain the potentially protein-fouled sample surface;

(e) Color change of the Bradford reagent (from brown to blue) qualitatively indicates the presence of adsorbed proteins.

The incubation protocol for microbial adsorption tests on the molded circular plate samples is herein described by the schematic diagram in FIG. 1. The starting inoculum concentration of E. coli (ATCC® 8739™) and S. aureus (ATCC® 6538P™) was about $0.9 \times 10^6$ and $8 \times 10^8$ cells/ml in 1/500 NB solution (1/500 NB refers to the 500× diluted Nutrient Broth with pH adjusted to 6.8-7.2) for challenging the sample surface. Result of the adsorption tests are illustrated in the following examples, and also in FIG. 4B and FIG. 5C.

EXAMPLES

The embodiments of the present invention can be better understood by reference to the following examples which are offered by way of illustration. The present invention is not limited to the examples given herein.

Example 1

Figure 4:
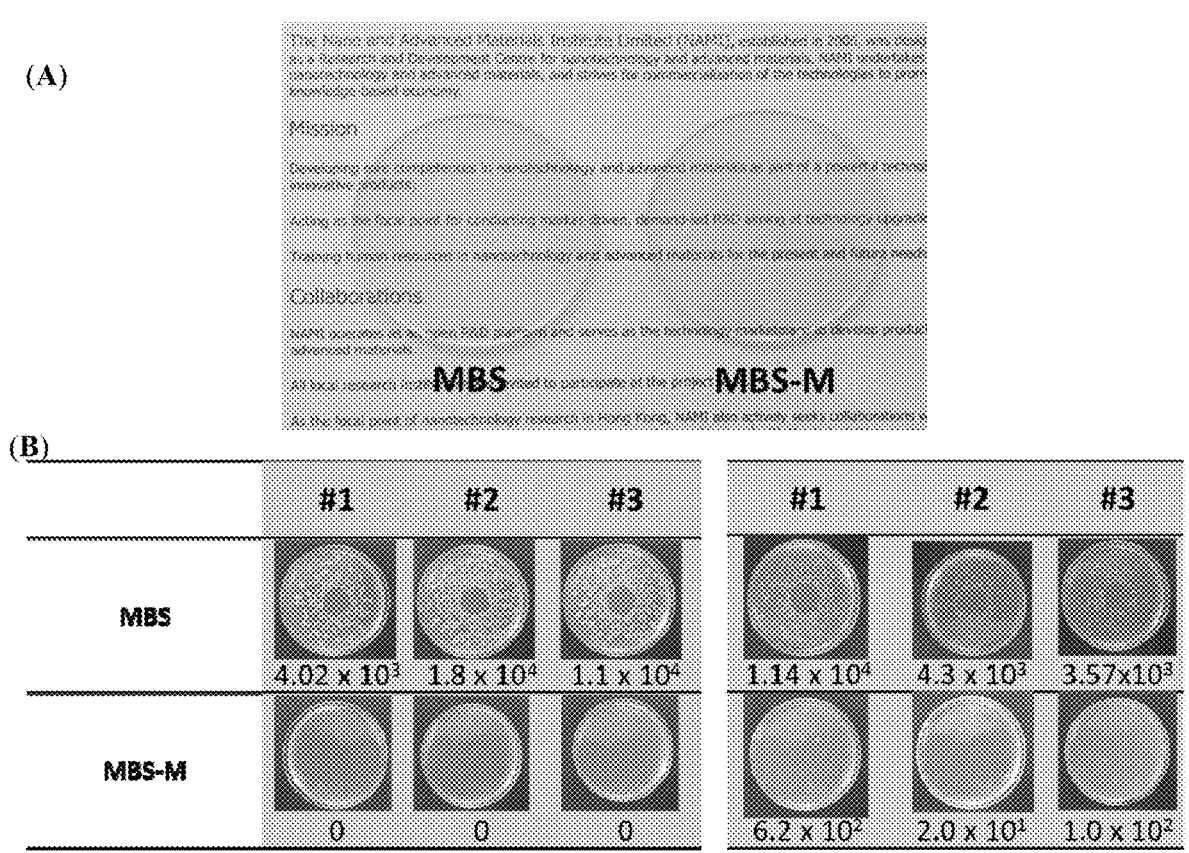
FIG. 4 illustrates the test results of the molded plate samples made of one of the modified transparent grade base thermoplastics (MBS-M) against a control (MBS): (A) is an image of molded MBS vs MBS-M plate samples placed on top of a piece of paper; (B) shows microbial adsorption test of the molded MBS vs MBS-M circular plate samples by an image taken from aerial view. The left three sets of image represents the microbial adsorption of MBS towards *Escherichia Coli*, and the right three sets of image represents the microbial adsorption of MBS towards *Staphylococcus Aureus*.

The modification of MBS, a highly transparent methyl methacrylate butadiene styrene plastic compound, was rendered by extrusive compounding of 94% MBS resin with 1% IRGANOX® B 225 and 5% AEO-5, a fatty alcohol ethoxylate, on a weight basis with a processing temperature ranging from 180° C. to 210° C. to obtain functional resin directly. The modified formulation was re-pelletized as standalone resin (herein annotated as MBS-M) that could be fed into an injection molding machine (with processing temperature of 210° C.) to obtain plastic samples dictated by the mold tooling design. FIG. 4A shows that the molded plate samples made of MBS-M according to the present method remain essentially transparent. The characterization results are summarized in Table 1. The impact strength of MBS-M was almost double that of the base MBS plastic apart from the added microbial repellent performance towards E. coli, a Gram-negative and S. aureus, a Gram-positive bacteria. MBS-M passed ISO 22196's antibacterial requirement by showing a nearly log-4 reduction of bacterial counts after intimate contact with corresponding molded plate samples with accredited report certificate. The plate samples also indicated zero-growth ratings consistently over 21 days under ASTM G21 and ASTM G22 standards with accredited report certificates. Besides, the total aerobic microbial count and the total combined molds and yeasts of the MBS-M pellets were less than 10 CFU/g according to USP <61> enumeration tests with accredited report certificate.

TABLE 1

| Sample | Transparency (%) | Haze (%) | Izod Impact Strength (KJ/m$^2$) | HDT (° C.) | Elongation at break (%) | Mechanical Strength (N/mm$^2$) | % reduction of E. coli adsorption (%) | % reduction of S. aureus adsorption (%) |
|---|---|---|---|---|---|---|---|---|
| MBS (Control) | 88.4 | 7.3 | 24.42 | 83.5 | 89.2 | 28.04 | — | — |
| MBS-M | 89.6 | 6.5 | 47.11 | 79.8 | 82.6 | 24.37 | 99% | 96% |

Example 2

Figure 5:
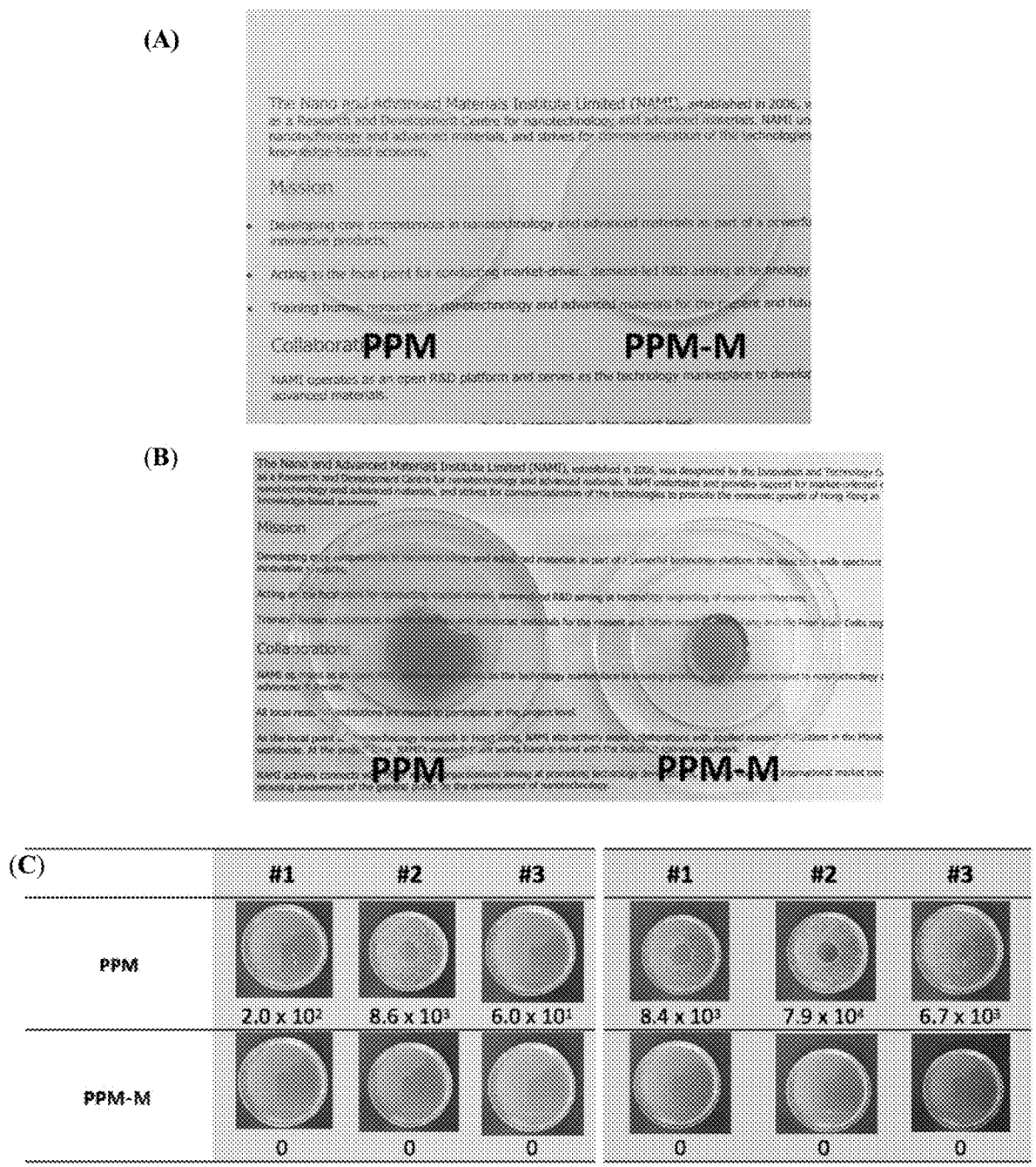
FIG. 5 illustrates the test results of the molded plate samples made of one of the modified transparent grade base thermoplastics (PPM-M) against a control (PPM): (A) is an image of molded PPM vs PPM-M plate samples placed on top of a piece of paper; (B) is an image of molded PPM vs PPM-M plate samples after being tested in a protein repellent assay according to the protocol as described hereinafter; (C) shows microbial adsorption test of the molded PPM vs PPM-M circular plate samples by an image taken from aerial view. The left three sets of image represents the microbial adsorption of PPM towards *Escherichia Coli*, and the right three sets of image represents the microbial adsorption of PPM towards *Staphylococcus Aureus*.

The modification of PPR, a transparent polypropylene random copolymer, was rendered by extrusive compounding of PPR resin with 30% polyolefin elastomer (VISTA-MAXX™ 6202, ExxonMobil), 2% JEFFAMINE® D-230, 2% poly(ethylene glycol) sorbitol hexaoleate, 3.75% alumina nanoparticles, 0.1% dicumyl peroxide, 0.05% triallyl isocyanurate and 0.01% CBS-127, an optical brightener, on a weight basis with processing temperature ranging from 170° C. to 190° C. to obtain a functional masterbatch concentrate (herein, annotated as PPR-M) after pelletization. The masterbatch was dry blended at a ratio of 1:1.5 w:w PPR with 0.1% overall by weight of NX8000 and subsequently fed into an injection molding machine (with processing temperature of 190° C.) to obtain plastic samples. The characterization results are summarized in Table 2. Alumina nanoparticles helped to minimize the reduction of heat deflection temperature (HDT) by counteracting the influence of addition of polyolefin elastomer.

tion. The masterbatch was dry blended at a ratio of 1:1.5 w:w PPM with 0.1% overall by weight of IRGANOX® 1010 and 0.1% overall by weight of IRGAFOS® 168 for injection molding with processing temperature of 190° C. FIG. 5A shows that the molded plate sample of PPM-M is essentially transparent; The characterization results are summarized in Table 3, and also in FIG. 5B and FIG. 5C. FIG. 5B shows that when BSA protein solution added on the molded plate sample made of PPM-M effectively repelled protein adsorption onto the surface. Solution of bovine serum albumin (BSA), a protein molecule, was dropped on the sample surface for five minutes prior to aspiration. The Bradford Reagent (Coomassie Blue), which could react with the nitrogen of the BSA, was then dropped on the sample surface. The sample surface where BSA was adsorbed on would change Bradford Reagent from brown into blue color, indicating the adsorption of protein on the surface. Those surfaces repelled protein adsorption would keep Bradford reagent brown, indicating the protein repellency of sample surface. FIG. 5C shows that E. coli and S. aureus are substantially repelled (>99%) by the molded plate sample made of PPM-M. PPM-M passed ISO 22196 by showing a nearly log-4 reduction of bacterial counts after intimate contact with corresponding molded plate samples with accredited report certificate. PPM-M also passed ASTM G21 and ASTM G22 by indicating zero-growth ratings consistently over 21 days with accredited report certificate. Besides, PPM-M showed zero rating meaning a complete resistance against the pink staining by Streptoverticillium reticulum with accredited report certificate. Under ASTM E2149, a dynamic shake flask antibacterial test, PPM-M molded plates showed 100% and 90.7% reduction of E. coli and S. aureus respectively upon 24 hours of incubation with accredited report certificate. Under ISO 20645, an agar diffusion plate test, nil growth of E. coli, S. aureus, Salmonella typhimurium, Campylobacter jejuni under samples

TABLE 2

| Sample | Transparency (%) | Haze (%) | Izod Impact Strength (KJ/m$^2$) | HDT (° C.) | Yellowness Index | Protein repellency | % reduction of E. coli adsorption (%) | % reduction of S. aureus adsorption (%) |
|---|---|---|---|---|---|---|---|---|
| PPR (Control) | 84.1 | 26.4 | 7.21 | 78.1 | 10.6 | No | — | — |
| PPR-M | 82.5 | 28.2 | 15.42 | 77.6 | 11.9 | Yes | >99% | >99% |

Example 3

The modification of PPM, an impact-modified polypropylene compound, was rendered by extrusive compounding of PPM resin with 2% JEFFAMINE® D-230, 2% AEO-5, 1% MILLAD® NX8000, 0.1% dicumyl peroxide and 0.05% triallyl isocyanurate with processing temperature ranging from 170° C. to 190° C. to obtain a functional masterbatch concentrate (herein, annotated as PPM-M) after pelletizawere observed while zero zone of inhibition were obtained with accredited test certificate, thus implicative of no free biocide leaching. The samples were antibacterial towards Klebsiella pneumoniae by showing 72% reduction of counts after 24 hours of contact even with agar slurries under ASTM E2180 with accredited report certificate. Furthermore, the total aerobic microbial count and the total combined molds and yeasts of the PPM-M pellets were less than 10 CFU/g according to USP <61> enumeration tests with accredited report certificate. The samples also complied with the overall migration limits for the three types of stimulants used (3% w/v acetic acid, 10% v/v ethanolic solution and rectified olive oil) at 70° C. for 2 hours as well as the two types of stimulants (3% w/v acetic acid, 10% v/v ethanolic solution) at 100° C. for 4 hours, as set out by EU No. 10/2011 as well as conformed to US FDA 21 CFR 177.1520 (d), Items 3.1a and 3.2a as a polypropylene copolymer for intended uses in food contact articles. Relevant certificates issued from accredited agency were available. Furthermore, the total aerobic microbial count and the total combined molds and yeasts of the PPM-M pellets were less than 10 CFU/g according to USP <61> enumeration tests with accredited report certificate. The samples were also proven to be biocompatible under ISO 10993-4 (both direct contact and extract method) hemolysis tests and ISO 10993-5 (MEM elution method) cytotoxicity tests with accredited report certificates. Last but not least, an even slight increase of the impact strength of the base PPM plastic after modification was resulted.

TABLE 3

| Sample | Transparency (%) | Haze (%) | Izod Impact Strength (KJ/m$^2$) | HDT (° C.) | Repellency towards Protein | % reduction of E. coli adsorption (%) | % reduction of S. aureus adsorption (%) |
|---|---|---|---|---|---|---|---|
| PPM (Control) | 81.9 | 23.7 | 44.55 | 71.8 | No | NA | NA |
| PPM-M | 82.6 | 20.3 | 47.46 | 73.1 | Yes | >99% | >99% |

Example 4

The modification of PPH, a transparent polypropylene homopolymer, was rendered by extrusive compounding of PPH resins with 30% VISTAMAXX' 3980FL, 2% JEFFAMINE® D-230, 2% poly(ethylene glycol) sorbitol hexaoleate, 0.1% dicumyl peroxide, 0.05% triallyl isocyanurate and 3.75% alumina nanoparticles with processing temperature ranging from 180° C. to 200° C. The reformulated pellets were then directly subjected to injection molding (with processing temperature of 200° C.) to get molded samples. The characterization results are summarized in the table below. The impact strength increased significantly by more than 120% with respect to the base PPH plastic. Alumina nanoparticles were added to keep the heat deflection temperature (HDT) of PPH as high as about 80° C. for warm water contacting applications. Characterization results are summarized in Table 4.

TABLE 4

| Sample | Yellowness Index | Transparency (%) | Haze (%) | Izod Impact Strength (KJ/m$^2$) | HDT (° C.) | Repellency towards Protein | % reduction of E. coli adsorption (%) | % reduction of S. aureus adsorption (%) |
|---|---|---|---|---|---|---|---|---|
| PPH (Control) | 10.06 | 83.9 | 17.0 | 4.49 | 98.9 | No | NA | NA |
| PPH-M | 15.83 | 81.6 | 29.5 | 9.94 | 79.2 | Yes | >99% | >99% |

Example 5

The modification of SEBS, a styrene ethylene butylene styrene block thermoplastic elastomer, was rendered by extrusive compounding of SEBS resins with 0.1% tosylic acid, 2.5% polyethylene glycol (average molecular weight of 10,000) and 2.5% AEO-5 on a weight basis with processing temperature ranging from 170° C. to 220° C. The reformulated pellets were directly subjected to injection molding (with a processing temperature of 210° C.) to obtain molded samples. Characterization results are summarized in Table 5

TABLE 5

| Sample | Yellowness Index | Transparency (%) | Haze (%) | Elongation at break (%) | Repellency towards Protein | % reduction of E. coli adsorption (%) | % reduction of S. aureus adsorption (%) |
|---|---|---|---|---|---|---|---|
| SEBS (Control) | 8.12 | 82.5 | 20.2 | 420% | No | NA | NA |
| SEBS-M | 10.03 | 79.2 | 26.4 | 400% | Yes | >99% | >98% |

What is claimed is:

1. A method for modifying a transparent grade base thermoplastic to enable biofouling resistance and mechanical reinforcement of an article formed therefrom against fluid biological matters in standalone solid or masterbatch concentrate form, said method comprising:
   (a) providing said transparent grade base thermoplastic to form a composition, wherein said transparent grade base thermoplastic comprises transparent grade polypropylene random copolymer or transparent grade methyl methacrylate butadiene styrene;
   (b) either blending said transparent grade base thermoplastic with a non-ionic surfactant, with or without impact modifiers, and with other additives directly or blending a masterbatch concentrate comprising said transparent grade base thermoplastic, said non-ionic surfacant, other additives, and optionally impact modifiers with a diluted form of said transparent grade base thermoplastic in order to form said composition, wherein said non-ionic surfactant is selected from the group consisting of fatty alcohol polyoxyalkylene ethers, polyoxyalkylene sorbitan/sorbitol fatty acid esters, polyoxyalkylene alkyl amines, and polether glycols, said impact modifiers are selected from the group consisting of polyolefin elastomers (POE) and thermoplastic polyurethane (TPU), and said other additives comprise one or more initiators, cross-linking agents, nucleators, anti-oxidants, or an auxiliary additive, wherein said initiators are selected from the group consisting of tosylic acid, tetramethylammonium hydroxide, and an organic peroxide selected from the group consisting of dicumyl peroxide, bis(tert-butylperoxyisopropyl) benzene, 2,5-bis(tert-butylperoxy)-2,5-dimethylhexane, and benzoyl peroxide, and said cross-linking agents are selected from the group consisting of triallyl isocyanurate, N,N'-m-phenylene bis-maleimide, and sulfur, and said auxiliary additive is alumnia nanoparticles;
   (c) melt processing said composition;
   (d) pelletizing said composition after said melting processing to form pellets; and
   (e) molding said pellets into article with desired shape and dimension.

2. The method of claim 1, wherein said melt processing comprises extrusion or hot melt mixing.

3. The method of claim 1, wherein said molding comprises profile extrusion, injection molding, blow molding, blow filming, film casting, spinning and overmolding on plastic substrates.

4. The method of claim 1, wherein said melt processing is carried out under a temperature ranging from 150 to 250° C.

5. The method of claim 1, wherein said melt processing is carried out under a temperature from 170 to 220° C.

6. The method of claim 1, wherein said transparent grade base thermoplastic and said pellets after melt processing has deviation of haze lower than 20% at 1 mm thickness under the standard of ASTM D1003.

7. The method of claim 1, wherein said non-ionic surfactant is selected from the group consisting of polyethylene glycol (PEG) sorbitol hexaoleate, AEO-5 and polyetheramine.

8. The method of claim 7, wherein said PEG sorbitol hexaoleate has an average molecular weight from 2000 to 20,000 Da.

9. The method of claim 7, wherein said polyetheramine has a molecular weight from 200 to 6,000 Da.

10. The method of claim 1, wherein said polyetheramine is selected from the group consisting of:

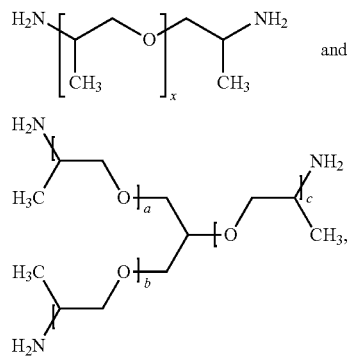

wherein x is 2.5 and a+b+c is 85.

11. The method of claim 1, wherein said non-ionic surfactants has a weight percentage from 0.5 wt % to 10 wt %.

12. The method of claim 1, wherein said polyolefin elastomer is a propylene-ethylene elastomer or an ethylene-octene elastomer.

13. The method of claim 1, wherein said impact modifiers have a weight concentration from 0.1 to 30 wt %.

14. The method of claim 1, wherein said nucleators are selected from the group consisting of:

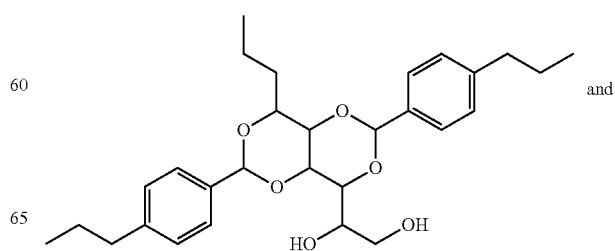

-continued

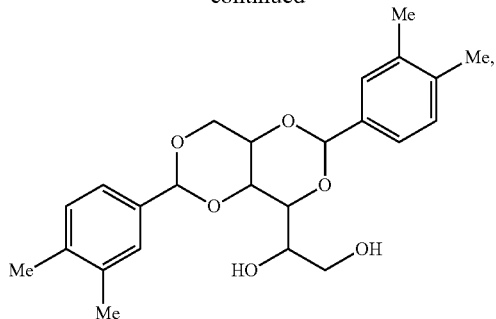

in a concentration from 0.1 to 3 wt %.

15. The method of claim 1, wherein said anti-oxidants are selected from the group consisting of: butylated hydroxytoluene,

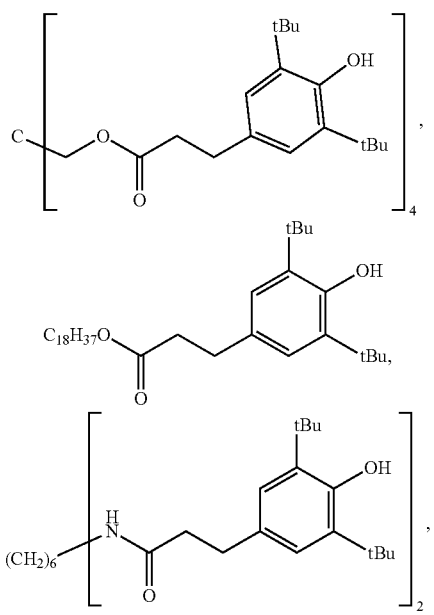

-continued

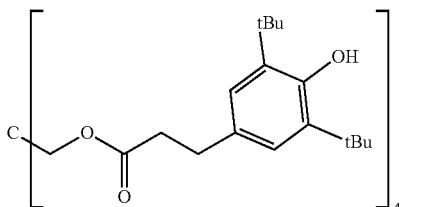

and a 1:1 mixture of

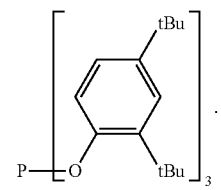

and

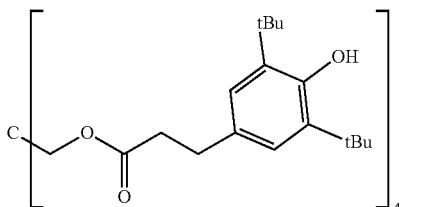

16. The method of claim 1, wherein said cross-linking agents have a weight percentage from 0.01 to 0.2 wt %.

17. The method of claim 1, wherein said nucleators have a weight percentage from 0.1 to 3 wt %.

18. The method of claim 1, wherein said anti-oxidants have a weight concentration from 0.1 to 2 wt %.

19. The method of claim 1, wherein said auxiliary additives have a weight percentage from 0.1 to 4 wt %.

20. The method of claim 1, wherein said masterbatch concentrate is formed by extruding said transparent grade base thermoplastic, said non-ionic surfactant, other additives and optionally said impact modifiers prior to said blending of the masterbatch concentrate with a diluted form of said transparent grade base thermoplastic.

* * * * *